United States Patent
Davarpanah et al.

(10) Patent No.: US 12,523,688 B2
(45) Date of Patent: Jan. 13, 2026

(54) ZERO-SEQUENCE IMPEDANCE MEASUREMENT OF COUPLED AC TRANSMISSION LINES

(71) Applicants: Mahdi Davarpanah, Tehran (IR); Hamed Morsali, Tehran (IR)

(72) Inventors: Mahdi Davarpanah, Tehran (IR); Hamed Morsali, Tehran (IR)

(73) Assignee: Electronic Sazan Fan Aria Company (IR)

( * ) Notice: Subject to any disclaimer, the term of this patent is extended or adjusted under 35 U.S.C. 154(b) by 0 days.

(21) Appl. No.: 17/897,799

(22) Filed: Aug. 29, 2022

(65) Prior Publication Data

US 2022/0413026 A1    Dec. 29, 2022

(51) Int. Cl.
*G01R 27/16* (2006.01)
*G01R 31/52* (2020.01)

(52) U.S. Cl.
CPC .............. *G01R 27/16* (2013.01); *G01R 31/52* (2020.01)

(58) Field of Classification Search
CPC ....... G01R 27/16; G01R 31/52; G01R 31/086
See application file for complete search history.

(56) References Cited

U.S. PATENT DOCUMENTS

| | | | |
|---|---|---|---|
| 11,050,239 B2 * | 6/2021 | Liu | G01R 31/085 |
| 2020/0067445 A1 * | 2/2020 | Chowdhury | H02P 29/0241 |

* cited by examiner

*Primary Examiner* — Farhana A Hoque

(57) ABSTRACT

A method for impedance measurement of coupled AC transmission lines. The method includes measuring a zero-sequence impedance of a three-phase transmission line that are configured to transmit electric power from a first substation of a power system to a second substation of the power system. Measuring the zero-sequence impedance includes disconnecting the three-phase transmission line from the power system, connecting a receiving end of the first three-phase transmission line to a local ground, connecting each phase of the three-phase transmission line at a sending end of the three-phase transmission line to a terminal node, measuring a zero-sequence current of the first three-phase transmission line, measuring a zero-sequence voltage of the three-phase transmission line, and calculating the zero-sequence impedance based on the zero-sequence current and the zero-sequence voltage.

12 Claims, 11 Drawing Sheets

100A

100B

ZERO-SEQUENCE IMPEDANCE MEASUREMENT OF COUPLED AC TRANSMISSION LINES

TECHNICAL FIELD

The present disclosure generally relates to electric power systems, and particularly, to AC transmission lines.

BACKGROUND

Electric power systems are among most complex networks that are widely deployed around the globe to supply electric power. Alternating current (AC) transmission lines are major components of power systems for power transmission from power sources to substations. Therefore, study of transmission lines may be necessary to ensure reliable operation of power systems.

Measuring electrical impedances of AC transmission lines may provide valuable information to perform power system studies, including stability analysis, fault locations, line protection, and power flow analysis. Various methods have already been disclosed for impedance measurement of AC transmission lines. However, current methods face significant challenges in accurate impedance measurement, such as signal interference on a line under test from other transmission lines that may be fully or partially coupled with a line under test (i.e., located close enough to a line under test that may induce electric potential on the line). An induced signal may significantly reduce accuracy of impedance measurements, which may consequently lead to invalid analyses of power systems.

Some conventional impedance measurement methods entail removing all transmission lines that may be coupled with a line that may have to undergo an impedance measurement process (i.e., a line under test) from a power system prior to starting the test to resolve interference issues. However, this approach may lead to disconnecting several end-users from a power source for a considerable amount of time. Other impedance measurement methods utilize significantly large test signals to override signal interference. However, such impedance measurement methods may require large, heavy, and costly equipment to provide appropriate signals, thereby limiting application of current impedance measurement methods.

While an induced voltage may exist on a line under test due to current passing through an adjacent line with frequency of $f_s$, an off-frequency power supply may be utilized to measure an impedance of the out of service line under test. Generally, two frequency points equal to $f_s - \Delta f$ and $f_s + \Delta f$ may be selected for impedance measurement. However, this approach may not only require an inverter-based power supply with an adjustable frequency, but may also need a maximum output voltage larger than the induced voltage on the line under test. Consequently, providing appropriate conditions for impedance measurement of long transmission lines that are commonly coupled with other AC lines may impose high costs on testing power systems.

There is, therefore, a need for an impedance measurement method of AC transmission lines that may be robust against signal interference without disconnecting transmission lines that are not being tested. There is also a need for a cost-efficient method for impedance measurement that may be implemented on low-cost and portable equipment.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure is directed to an exemplary method for zero-sequence impedance measurement of coupled AC transmission lines. An exemplary method may include measuring a first zero-sequence impedance of a first three-phase transmission line that may be configured to transmit electric power from a first substation of a power system to a second substation of the power system. An exemplary first three-phase transmission line may be coupled with a second three-phase transmission line that may be configured to transmit electric power to a third substation of the power system. In an exemplary embodiment, measuring the first zero-sequence impedance may include disconnecting the first three-phase transmission line from the power system, connecting a receiving end of the first three-phase transmission line to a first local ground, connecting each phase of the first three-phase transmission line at a sending end of the first three-phase transmission line to a first terminal node, obtaining a first zero-sequence current of the first three-phase transmission line, obtaining a first zero-sequence voltage of the first three-phase transmission line, and calculating the first zero-sequence impedance based on the first zero-sequence current and the first zero-sequence voltage. In an exemplary embodiment, the first zero-sequence current and the first zero-sequence voltage may be due to an induced voltage on the first three-phase transmission line from the second three-phase transmission line.

In an exemplary embodiment, obtaining the first zero-sequence current may include connecting the first terminal node to a second local ground by closing a single-phase circuit breaker, measuring a short-circuit current that may pass through the first terminal node to the second local ground, and obtaining the first zero-sequence current from the short-circuit current by compensating a phase of the short-circuit current according to a phase of a first reference signal. An exemplary single-phase circuit breaker may be connected between the first terminal node and the second local ground.

In an exemplary embodiment, compensating the phase of the short-circuit current may include measuring the first reference signal at a busbar of the second substation simultaneously with measuring the short-circuit current and calculating the first zero-sequence current based on the short-circuit current and the first reference signal.

In an exemplary embodiment, obtaining the first zero-sequence voltage may include disconnecting the first terminal node from the second local ground by opening the single-phase circuit breaker, measuring an open-circuit voltage at the first terminal node, and obtaining the first zero-sequence voltage from the open-circuit voltage by compensating a phase of the open-circuit voltage according to a phase of a second reference signal. An exemplary single-phase circuit breaker may be opened less than about 1 second after measuring the short-circuit current.

In an exemplary embodiment, measuring the open-circuit voltage may include connecting a primary side of a potential transformer (PT) between the first terminal node and the second local ground, measuring a secondary voltage of the PT at a secondary side of the PT, and obtaining the open-circuit voltage based on the secondary voltage.

An exemplary method may further include measuring a second zero-sequence impedance of an uncoupled segment of the first three-phase transmission line. In an exemplary embodiment, measuring the second zero-sequence impedance may include connecting the sending end of the first three-phase transmission line to the second local ground, connecting each phase of the first three-phase transmission line at an uncoupled test point of the first three-phase transmission line to a second terminal node, obtaining a second zero-sequence current that may pass through the second terminal node by measuring each respective electric current that may pass through each respective phase of the first three-phase transmission line, measuring a second zero-sequence voltage of the first three-phase transmission line, and calculating the second zero-sequence impedance based on the second zero-sequence current and the second zero-sequence voltage. An exemplary uncoupled test point may be located at the uncoupled segment. In an exemplary embodiment, the second zero-sequence current and the second zero-sequence voltage may be due to the induced voltage.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
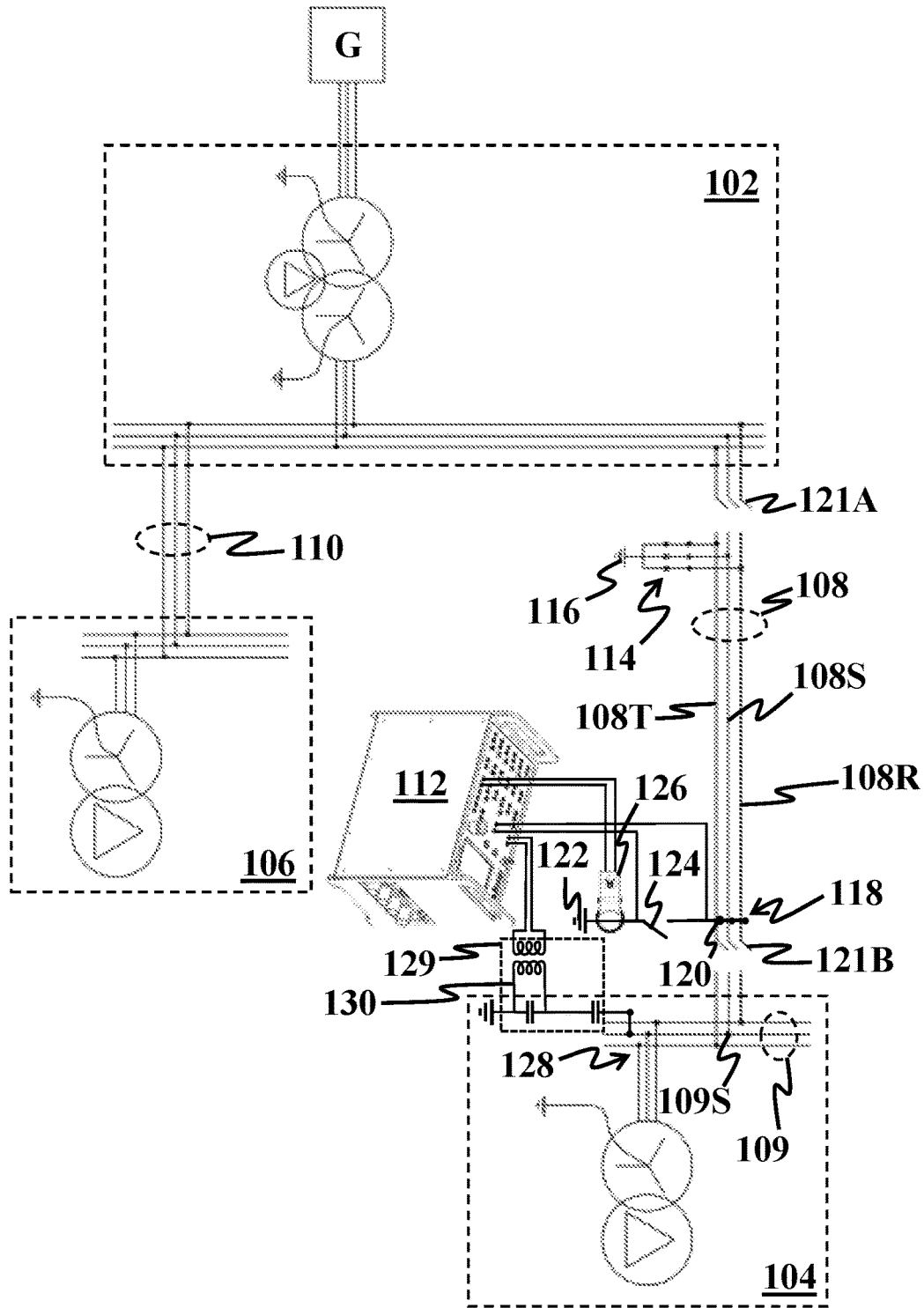
FIG. 1A shows a schematic of a first power system setup for a first zero-sequence impedance measurement of coupled AC transmission lines, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed an exemplary method for zero-sequence impedance measurement of coupled AC transmission lines. In an exemplary embodiment, a "zero-sequence impedance" may refer to an impedance that is offered by a power system to a flow of zero-sequence current. An exemplary "zero-sequence current" may refer to a vector sum of phase currents of a three-phase line in a power system which flow in a neutral or a ground in a power system. In an exemplary embodiment, a three-phase line that is examined for zero-sequence impedance measurement may be referred to as a "line under test." An exemplary signal may be induced on a line under test from another transmission line that is coupled with the line under test. An exemplary method may utilize an exemplary induced signal (such as a voltage) on an exemplary line under test for impedance measurement. To do so, an exemplary line under test may be disconnected from a power system so that an induced signal may be a voltage source of signal generation on the line under test. Afterwards, one or both ends of an exemplary isolated Afterwards, one or both ends of an exemplary isolated transmission line may be grounded. Next, an exemplary line impedance may be obtained by measuring voltage and electric current of the transmission line. Exemplary measured impedances may include a first zero-sequence impedance of an entire AC transmission line and a second zero-sequence impedance of an uncoupled segment (that is, a segment that is not receiving electromagnetic induction from another transmission line) of the AC transmission line.

FIG. 1A shows a schematic of a first power system setup for a first zero-sequence impedance measurement of coupled AC transmission lines, consistent with one or more exemplary embodiments of the present disclosure. In an exemplary embodiment, a first power system setup 100A may include a first substation 102, a second substation 104, and a third substation 106. An exemplary first three-phase transmission line 108 may be configured to transmit electric power from first substation 102 to second substation 104. In an exemplary embodiment, first three-phase transmission line 108 may be partially coupled with a second three-phase transmission line 110. In an exemplary embodiment, "partially coupled" transmission lines may refer to transmission lines that include segments close enough in proximity, resulting in an induction of voltage or electric current on a coupled segment. In an exemplary embodiment, second three-phase transmission line 110 may be configured to transmit electric power from first substation 102 to third substation 106.

Figure 2A:
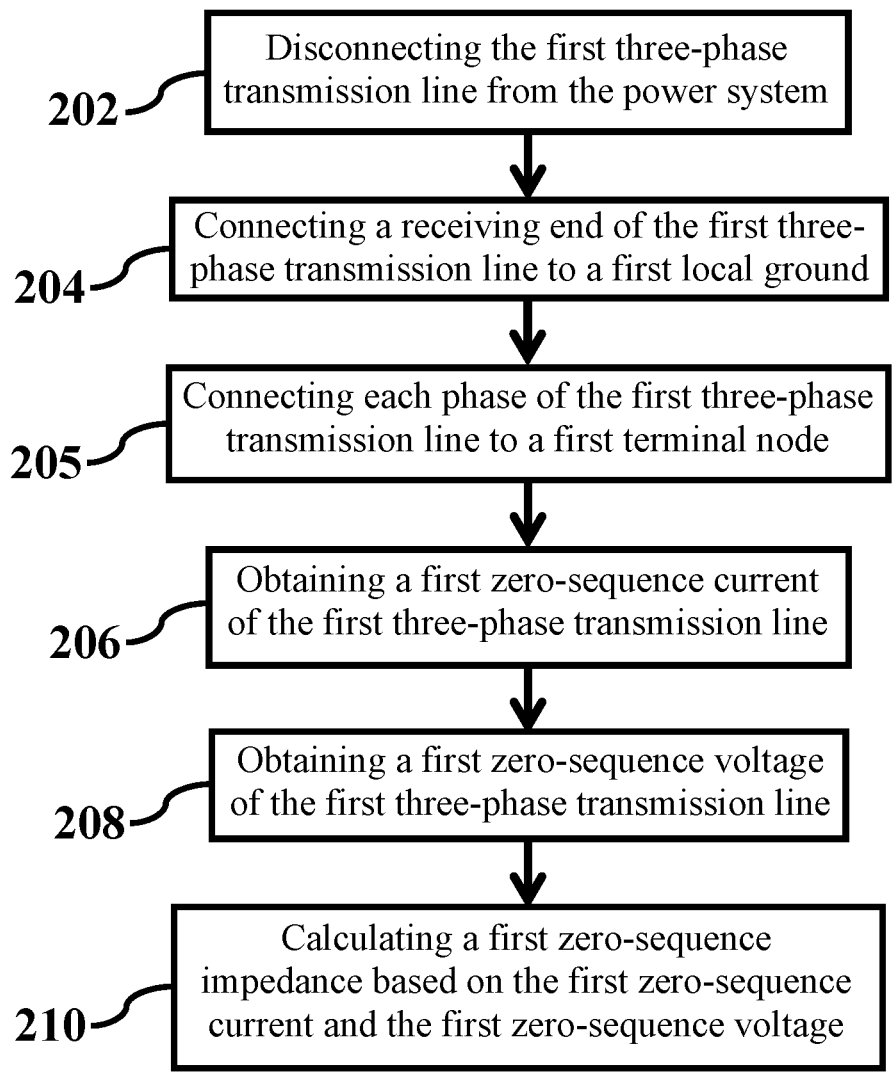
FIG. 2A shows a flowchart of a method for a first zero-sequence impedance measurement of coupled AC transmission lines, consistent with one or more exemplary embodiments of the present disclosure.

FIG. 2A shows a flowchart of a method for a first zero-sequence impedance measurement of coupled AC transmission lines, consistent with one or more exemplary embodiments of the present disclosure. An exemplary method 200 may be utilized for measuring a first zero-sequence impedance of a first three-phase transmission line, such as first three-phase transmission line 108. Referring to FIGS. 1A and 2A, a processing unit 112 may be utilized to apply method 200 to first three-phase transmission line 108. In an exemplary embodiment, method 200 may include measuring a first zero-sequence impedance of a first three-phase transmission line. In an exemplary embodiment, measuring the first zero-sequence impedance may include disconnecting the first three-phase transmission line from a first power system setup (step 202), connecting a receiving end of the first three-phase transmission line to a first local ground (step 204), connecting each phase of the first three-phase transmission line at a sending end of the first three-phase transmission line to a first terminal node (step 205), measuring a first zero-sequence current of the first three-phase transmission line (step 206), measuring a first zero-sequence voltage of the first three-phase transmission line (step 208), and calculating the first zero-sequence impedance based on the first zero-sequence current and the first zero-sequence voltage (step 210).

In an exemplary embodiment, step 202 may include disconnecting first three-phase transmission line 108 from first power system setup 100A. Exemplary disconnectors 121A and 121B may be utilized to disconnect first three-phase transmission line 108 from first power system setup 100A. In an exemplary embodiment, a "disconnector" may refer to an electrical piece of equipment (for example, a switch) that may be connected between two different segments of an electrical circuit (such as a power system) and may be configured to disconnect the segments by opening an exemplary switch. In an exemplary embodiment, disconnectors 121A and 121B may be connected to receiving end 114 and sending end 118, respectively. In an exemplary embodiment, by opening disconnectors 121A and 121B, first three-phase transmission line 108 may safely be disconnected from first power system setup 100A. As a result, in an exemplary embodiment, no power may be transmitted through first three-phase transmission line 108.

In an exemplary embodiment, step 204 may include connecting a receiving end 114 of first three-phase transmission line 108 to a first local ground 116. In an exemplary embodiment, receiving end 114 may be connected to first local ground 116 by closing an exemplary earthing switch (also called a "ground switch") that may be connected between receiving end 114 and first local ground 116. An exemplary "earthing switch" may refer to a switch that may be configured to ground receiving end 114 when the earthing switch is closed. An exemplary earthing switch may be connected to each phase (for example, a first phase 108R, a second phase 108S, and a third phase 108T) of first three-phase transmission line 108 at receiving end 114. Therefore, all phases of first three-phase transmission line 108 may be grounded when an exemplary earthing switch is closed.

In an exemplary embodiment, step 205 may include connecting each phase of first three-phase transmission line 108 at sending end 118 to a first terminal node 120. In an exemplary embodiment, each phase of first three-phase transmission line 108 (for example, first phase 108R, second phase 108S, and third phase 108T) may be connected to first terminal node 120 at sending end 118. In an exemplary embodiment, first terminal node 120 may be in a sending end substation switchgear. An exemplary switchgear may include a number of disconnectors, circuit breakers, and/or instrument transformers that may be configured to protect first power system setup 100A. An exemplary switchgear may be directly connected to first three-phase transmission line 108. Therefore, in an exemplary embodiment, all phases of first three-phase transmission line 108 may be connected to first terminal node 120 by connecting each phase of first three-phase transmission line 108 to other phases of first three-phase transmission line 108 at sending end 118.

Figure 2B:
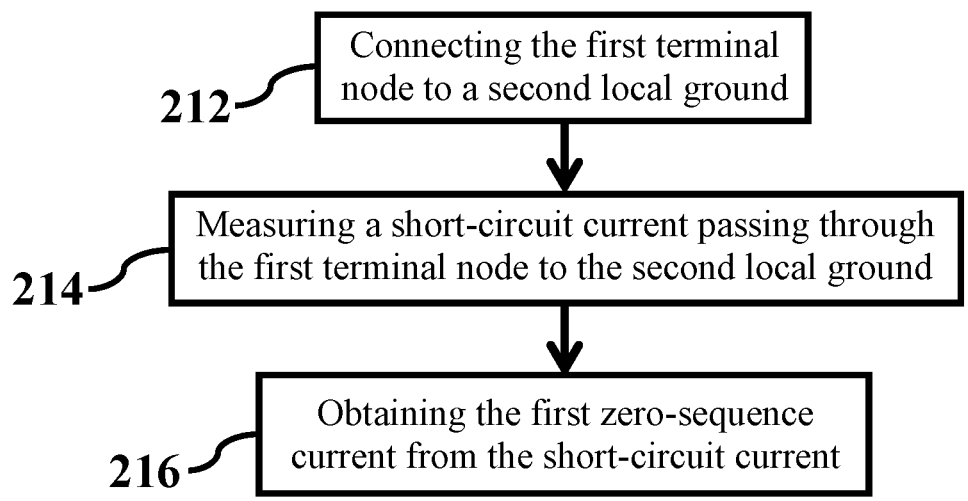
FIG. 2B shows a flowchart for obtaining a first zero-sequence current of a first three-phase transmission line, consistent with one or more exemplary embodiments of the present disclosure.

In further detail with respect to step 206, FIG. 2B shows a flowchart for obtaining a first zero-sequence current of a first three-phase transmission line, consistent with one or more exemplary embodiments of the present disclosure. In an exemplary embodiment, obtaining the first zero-sequence current in step 206 may include connecting the first terminal node to a second local ground (step 212), measuring a short-circuit current that may pass through the first terminal node to the second local ground (step 214), and obtaining the first zero-sequence current from the short-circuit current by compensating a phase of the short-circuit current according to a phase of a first reference signal (step 216).

Referring to FIGS. 1A and 2B, in an exemplary embodiment, step 212 may include connecting first terminal node 120 to a second local ground 122 by closing a single-phase circuit breaker 124. In an exemplary embodiment, single-phase circuit breaker 124 may be connected between first terminal node 120 and second local ground 122.

In an exemplary embodiment, step 214 may include measuring the short-circuit current that may pass through first terminal node 120 to second local ground 122. An exemplary current sensor 126 may be utilized for measuring the short-circuit current. In an exemplary embodiment, current sensor 126 may transmit samples of the measured short-circuit current to processing unit 112 at a given sampling rate (for example, about 10 kHz) to calculate a phasor of the short-circuit current (i.e., a magnitude and a phase of the short-circuit current). In an exemplary embodiment, a full-cycle discrete Fourier transform (DFT) algorithm may be applied to the samples of the measured short-circuit current to calculate the phasor of the short-circuit current. In an exemplary embodiment, the first zero-sequence current may be generated on first three-phase transmission line 108 due to an induced voltage on first three-phase transmission line 108 from second three-phase transmission line 110 since first three-phase transmission line 108 and second three-phase transmission line 110 are coupled.

Figure 2C:
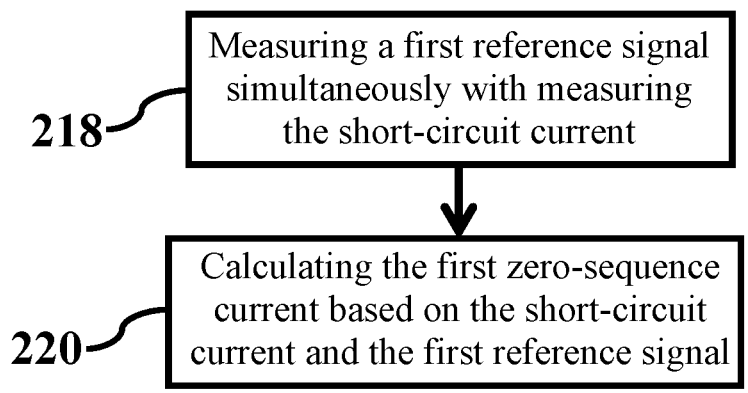
FIG. 2C shows a flowchart for compensating a phase of a short-circuit current, consistent with one or more exemplary embodiments of the present disclosure.

In further detail with respect to step 216, FIG. 2C shows a flowchart for compensating a phase of a short-circuit current, consistent with one or more exemplary embodiments of the present disclosure. In an exemplary embodiment, the phase of the short-circuit current may vary in time according to a frequency of first power system setup 100A. Therefore, in an exemplary embodiment, an accurate estimation of the phase may require estimating the frequency of first power system setup 100A with a high precision, which may impose a high computational cost on method 200. However, if an exemplary difference between the phase of the short-circuit current and an exemplary phase of a first reference signal is calculated, the phase of the short-circuit current may be compensated since a phase angle inaccurate estimation may similarly affect both phasors of the short-circuit current and the first reference signal, thereby being canceled in a resulting compensated phase.

In an exemplary embodiment, compensating the phase of the short-circuit current may include measuring the first reference signal at a busbar of the second substation simultaneously with measuring the short-circuit current (step 218) and calculating the first zero-sequence current based on the short-circuit current and the first reference signal (step 220).

In an exemplary embodiment, step 218 may include measuring the first reference signal at a busbar 128 of second substation 104 simultaneously with measuring the short-circuit current. An exemplary first reference signal may include a voltage of any phase of a three-phase transmission line 109 (for example, a phase 109S) of second substation 104 at busbar 128. An exemplary sensor (for example, a voltage sensor) may be utilized for measuring the first reference signal. Samples of the measured first reference signal may be transmitted to processing unit 112 at a given sampling rate (for example, about 10 kHz) to calculate a phasor of the first reference signal (i.e., a magnitude and a phase of the first reference signal). In an exemplary embodiment, a full-cycle DFT algorithm may be applied to the samples of the measured first reference signal to calculate the phasor of the first reference signal. An exemplary first reference signal may be measured using an exemplary capacitor voltage transformer 129. In an exemplary embodiment, a high-voltage terminal 130 of capacitor voltage transformer 129 may be connected to busbar 128.

For further detail with regards to step 220, in an exemplary embodiment, the first zero-sequence current may be calculated by compensating the phase of the short-circuit current based on the phase of the first reference signal according to an operation defined by the following:

$$\overline{I_{comp}} = I_{sc} \angle (\theta_{sc} - \theta_{ref1})$$ Equation (1)

where $\overline{I_{comp}}$ is a phasor of the first zero-sequence current, $I_{sc}$ is an amplitude of the short-circuit current, $\theta_{sc}$ is a phase of the short-circuit current, and $\theta_{ref1}$ is a phase of the first reference signal.

Figure 2D:
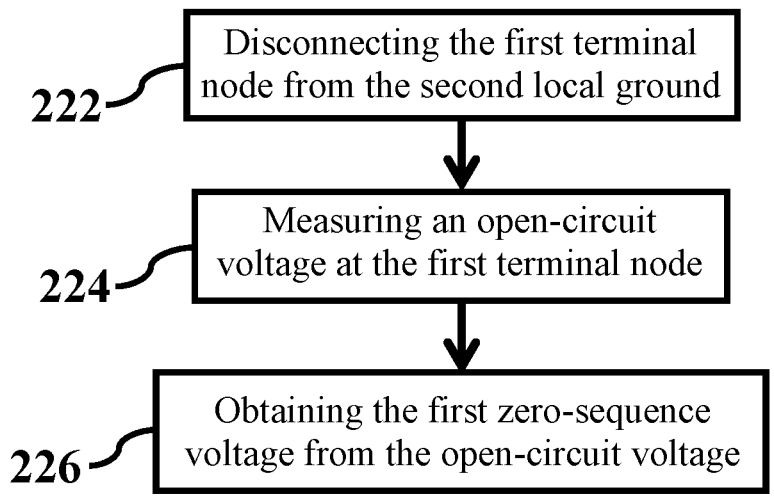
FIG. 2D shows a flowchart for obtaining a first zero-sequence voltage, consistent with one or more exemplary embodiments of the present disclosure.

Referring again to FIG. 2A, in an exemplary embodiment, step 208 may include obtaining the first zero-sequence voltage of first three-phase transmission line 108. FIG. 2D shows a flowchart for obtaining a first zero-sequence voltage, consistent with one or more exemplary embodiments of the present disclosure. In an exemplary embodiment, obtaining the first zero-sequence voltage in step 208 may include disconnecting the first terminal node from the second local ground (step 222), measuring an open-circuit voltage at the first terminal node (step 224), and obtaining the first zero-sequence voltage from the open-circuit voltage by compensating a phase of the open-circuit voltage according to a phase of a second reference signal (step 226).

Referring to FIGS. 1A and 2D, in an exemplary embodiment, step 222 may include disconnecting first terminal node 120 from second local ground 122 by opening single-phase circuit breaker 124. In an exemplary embodiment, single-phase circuit breaker 124 may be opened less than about 1 second after measuring the short-circuit current. As a result, an exemplary induced voltage on first three-phase transmission line 108 from second three-phase transmission line 110 may remain substantially unchanged during measuring the first zero-sequence voltage in step 208 with respect to measuring the first zero-sequence current in step 206 due to a short delay between steps 206 and 208. Therefore, measurement conditions of the first zero-sequence voltage and the first zero-sequence current may be consistent such that the measured values of the first zero-sequence voltage and the first zero-sequence current may be validly utilized for obtaining the first zero-sequence impedance, as discussed below in step 210. In an exemplary embodiment, first zero-sequence voltage may be generated on first three-phase transmission line 108 due to an induced voltage on first three-phase transmission line 108 from second three-phase transmission line 110 since first three-phase transmission line 108 and second three-phase transmission line 110 are coupled.

Figure 2E:
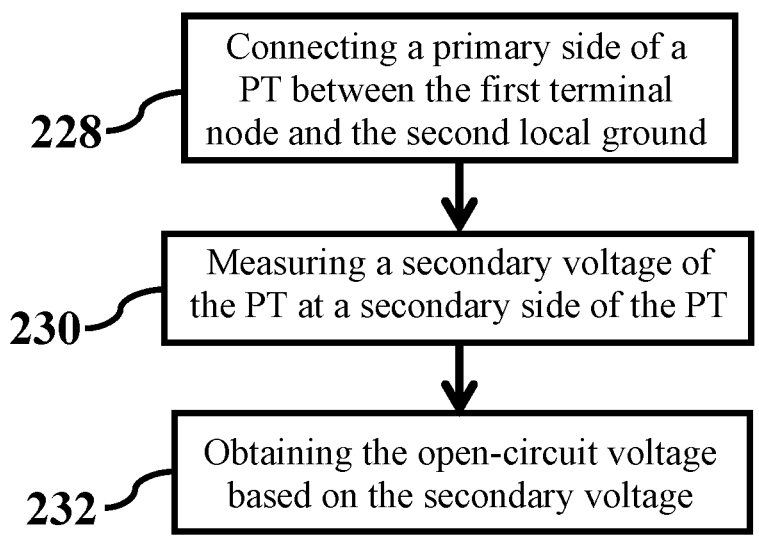
FIG. 2E shows a flowchart for obtaining an open-circuit voltage, consistent with one or more exemplary embodiments of the present disclosure.

In further detail with respect to step 224, FIG. 2E shows a flowchart for measuring an open-circuit voltage, consistent with one or more exemplary embodiments of the present disclosure. In an exemplary embodiment, measuring the open-circuit voltage in step 224 may include connecting a primary side of a potential transformer (PT) between the first terminal node and the second local ground (step 228), measuring a secondary voltage of the PT at a secondary side of the PT (step 230), and obtaining the open-circuit voltage based on the secondary voltage (step 232).

Figure 1B:
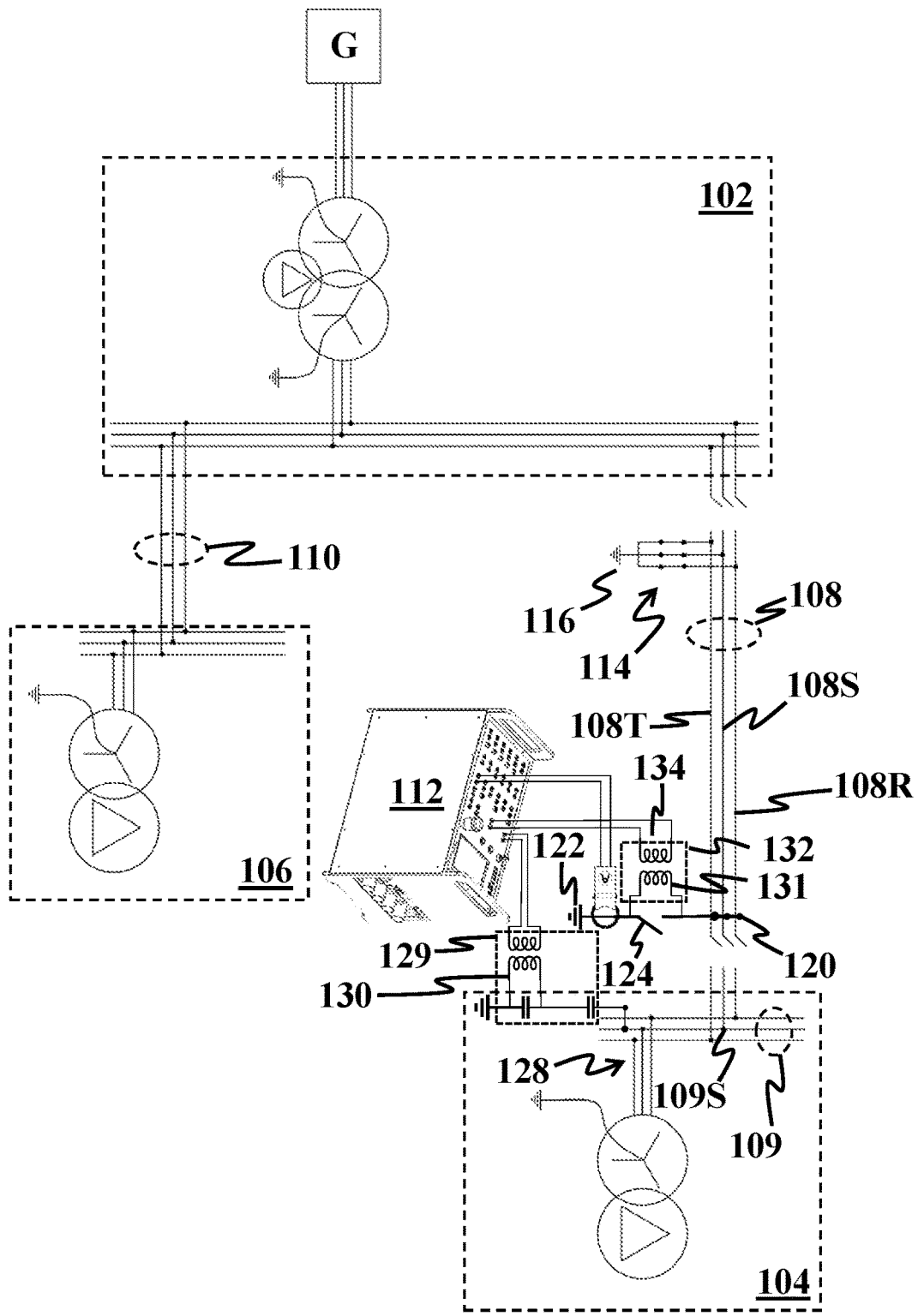
FIG. 1B shows a schematic of a second power system setup for a first zero-sequence impedance measurement of coupled AC transmission lines, consistent with one or more exemplary embodiments of the present disclosure.

FIG. 1B shows a schematic of a second power system setup for a first zero-sequence impedance measurement of coupled AC transmission lines, consistent with one or more exemplary embodiments of the present disclosure. An exemplary second power system setup 100B may include similar elements as in first power system setup 100A and may be utilized for measuring the open-circuit voltage.

In an exemplary embodiment, step 228 may include connecting a primary side 131 of a PT 132 between first terminal node 120 and second local ground 122. In an exemplary embodiment, primary side 131 may be connected in parallel with single-phase circuit breaker 124. In an exemplary embodiment, if a magnitude of the open-circuit voltage is small enough, a phasor of the open-circuit voltage may be directly measured across single-phase circuit breaker 124, as described in detail below.

In an exemplary embodiment, step 230 may include measuring a secondary voltage of PT 132 at a secondary side 134 of PT 132. In an exemplary embodiment, a turn ratio of PT 132 (i.e., ratio of a number of turns at primary side 131 winding to a number of turns at secondary side 134 winding) may be a relatively large value (for example, about 100). As a result, a high amplitude of an exemplary open-circuit voltage may be indirectly obtained based on the secondary voltage of PT 132 at secondary side 134, as described in detail below.

For further detail with regards step 232, in an exemplary embodiment, the open-circuit voltage may be obtained by measuring a primary voltage of PT 132 at primary side 131 responsive to the secondary voltage satisfying a condition according to $aV_m < V_{th}$, where a is the turn ratio of PT 132 where a>1, $V_m$ is an amplitude of the secondary voltage, $aV_m$ is an amplitude of the PT primary-side voltage, and $V_{th}$ is voltage measurement threshold. In an exemplary embodiment, turn ratio a may be set to about 100. Therefore, in an exemplary embodiment, the open-circuit voltage may directly be measured at primary side 131 across the single-phase circuit breaker 124, i.e., between first terminal node 120 and second local ground 122, if the primary voltage is smaller than voltage measurement threshold $V_{th}$. In an exemplary embodiment, voltage measurement threshold $V_{th}$ may be determined based on an upper limit of the measurement range of an exemplary voltage sensor. In an exemplary embodiment, voltage measurement threshold $V_{th}$ may be set to about 300 V.

In an exemplary embodiment, the open-circuit voltage may be obtained according to an operation defined by $\overline{V_{oc}}=a\overline{V_m}$ responsive to the secondary voltage satisfying a condition according to $aV_m \geq V_{th}$, where $\overline{V_{oc}}$ is a phasor of the open-circuit voltage and $\overline{V_m}$ is a phasor of the secondary voltage. Therefore, if an exemplary primary voltage is larger than or equal to voltage measurement threshold $V_{th}$, the secondary voltage may be measured at secondary side 134 and a phasor $\overline{V_{oc}}$ of open-circuit may then be calculated from the secondary voltage through multiplying the measured secondary voltage by the value of turn ratio a.

Figure 2F:
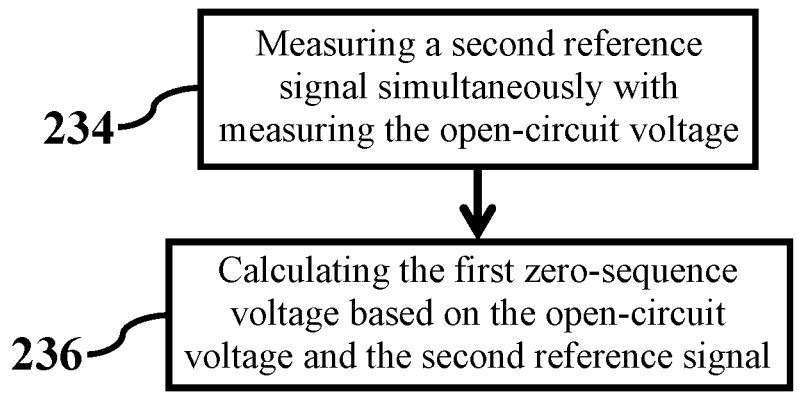
FIG. 2F shows a flowchart for compensating a phase of an open-circuit voltage, consistent with one or more exemplary embodiments of the present disclosure.

Referring again to FIG. 2D, in an exemplary embodiment, step 226 may include obtaining the first zero-sequence voltage from the open-circuit voltage by compensating the phase of the open-circuit voltage according to the phase of the second reference signal. FIG. 2F shows a flowchart for compensating a phase of an open-circuit voltage, consistent with one or more exemplary embodiments of the present disclosure. In an exemplary embodiment, the phase of the open-circuit voltage may vary in time according to a frequency of second power system setup 100B. Therefore, in an exemplary embodiment, an accurate estimation of the phase of the open-circuit voltage may require estimating the frequency of second power system setup 100B with a high precision, which may impose a high computational cost on method 200. However, if an exemplary difference between the phase of the of the open-circuit voltage and an exemplary phase of a second reference signal is calculated, the phase of the open-circuit voltage may be compensated since a phase angle inaccurate estimation may similarly affect both phasors of the of the open-circuit voltage and the second reference signal, thereby being canceled in a resulting compensated phase.

In an exemplary embodiment, compensating the phase of the open-circuit voltage in step 226 may include measuring the second reference signal at the busbar of the second substation simultaneously with measuring the open-circuit voltage (step 234) and calculating the first zero-sequence voltage based on the open-circuit voltage and the second reference signal (step 236).

Referring to FIGS. 1B and 2F, in an exemplary embodiment, step 234 may include measuring the second reference signal at busbar 128 simultaneously with measuring the open-circuit voltage. An exemplary second reference signal may include a voltage of any phase of a three-phase transmission line 109 (for example, a phase 109S) of second substation 104 at busbar 128. An exemplary sensor (for example, a voltage sensor) may be utilized for measuring the second reference signal. Samples of the measured second reference signal may be transmitted to processing unit 112 at a given sampling rate (for example, about 10 kHz) to calculate a phasor of the second reference signal (i.e., a magnitude and a phase of the second reference signal). An exemplary full-cycle DFT algorithm may be applied to the samples of the measured second reference signal to calculate the phasor of the second reference signal. In an exemplary embodiment, the second reference signal may be measured using capacitor voltage transformer 129.

For further detail with regards to step 236, in an exemplary embodiment, the first zero-sequence voltage may be calculated by compensating the phase of the open-circuit voltage based on the phase of the second reference signal according to an operation defined by the following:

$$\overline{V_{comp}} = V_{oc} \angle (\theta_{oc} - \theta_{ref2}) \quad \text{Equation (2)}$$

where $\overline{V_{comp}}$ is a phasor of the first zero-sequence voltage, $V_{oc}$ is an amplitude of the open-circuit voltage, $\theta_{oc}$ is a phase of the open-circuit voltage, and $\theta_{ref2}$ is the phase of the second reference signal.

After obtaining phasor $\overline{I_{comp}}$ of the first zero-sequence current and phasor $\overline{V_{comp}}$ of the first zero-sequence voltage, the first zero-sequence impedance may be calculated. Referring again to FIG. 2A, in an exemplary embodiment, step 210 may include calculating the first zero-sequence impedance according to an operation defined by the following:

$$\overline{Z0_{coupled}} = \frac{3\overline{V_{comp}}}{\overline{I_{comp}}} \quad \text{Equation (3)}$$

where $\overline{Z0_{coupled}}$ is a phasor of the first zero-sequence impedance.

In an exemplary embodiment, method 200 may be repeated for a number of times (for example, three times) to evaluate the consistency of obtained values for first zero-sequence impedance $\overline{Z0}$ by Equation (3). If different implementations of method 200 lead to similar results (i.e., in an exemplary embodiment, less than 2 percent of difference between each two different estimations of first zero-sequence impedance $\overline{Z0}$), the obtained results may be considered valid.

Figure 1C:
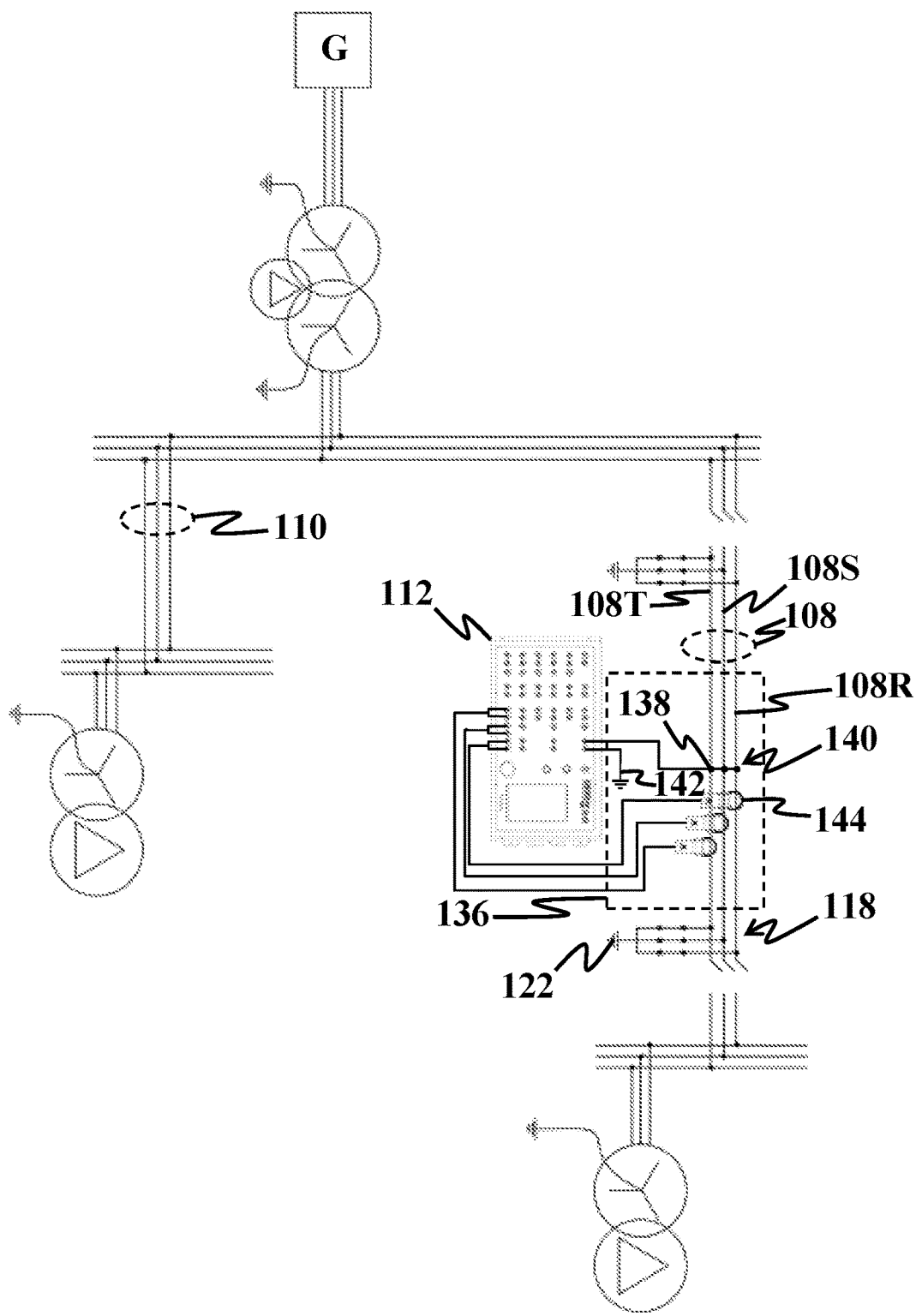
FIG. 1C shows a schematic of a third power system setup for a second zero-sequence impedance measurement of coupled AC transmission lines, consistent with one or more exemplary embodiments of the present disclosure.

FIG. 1C shows a schematic of a third power system setup for a second zero-sequence impedance measurement of coupled AC transmission lines, consistent with one or more exemplary embodiments of the present disclosure. In an exemplary embodiment, method 200 may further include measuring a second zero-sequence impedance of an uncoupled segment 136 of first three-phase transmission line 108. In an exemplary embodiment, an "uncoupled segment" may refer to a segment of first three-phase transmission line 108 that is not close enough to other lines of third power system setup 100C to receive an electromagnetic induction from the other lines. However, some exemplary parts of first three-phase transmission line 108 may be coupled with another line (for example, three-phase transmission line 110) of third power system setup 100C that may be located close enough to induce voltage on exemplary parts of three-phase transmission line 108. An exemplary induced voltage may be utilized for zero-sequence impedance measurement of uncoupled segment 136, as described below.

Figure 3:
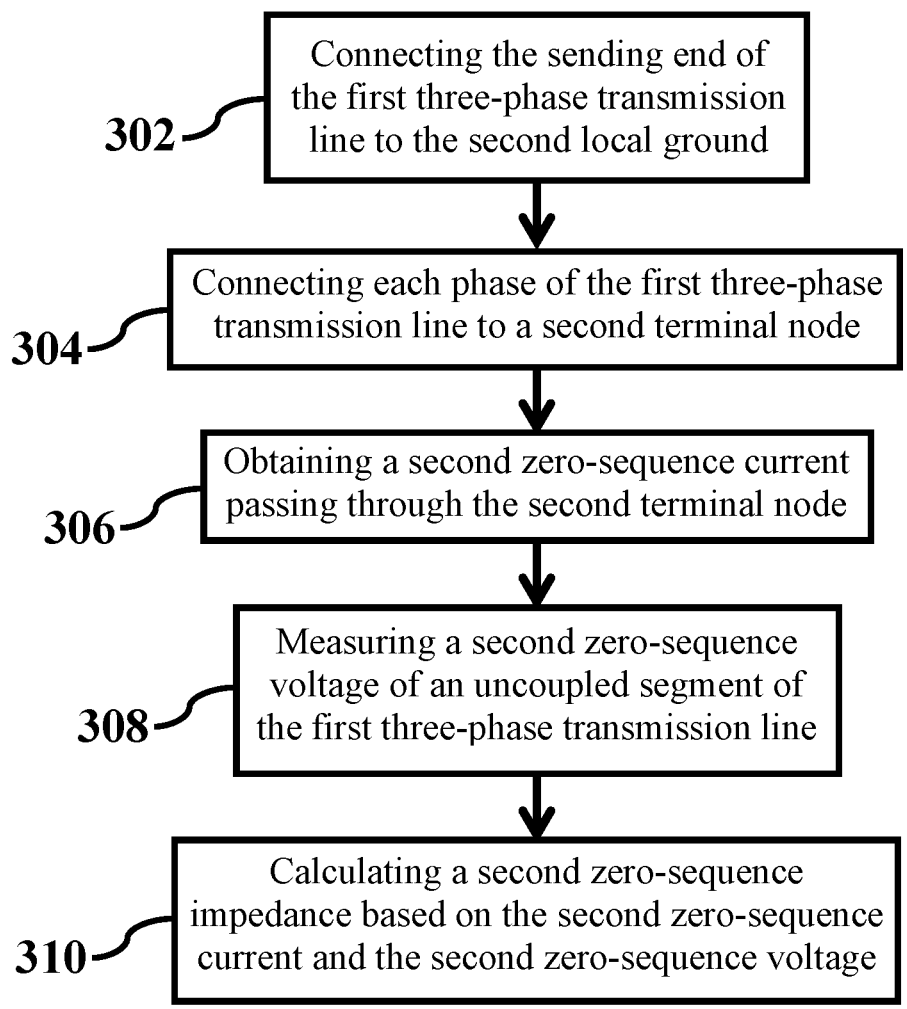
FIG. 3 shows a flowchart for measuring a second zero-sequence impedance, consistent with one or more exemplary embodiments of the present disclosure.

FIG. 3 shows a flowchart for measuring a second zero-sequence impedance, consistent with one or more exemplary embodiments of the present disclosure. In an exemplary embodiment, measuring the second zero-sequence impedance may include connecting the sending end of the first three-phase transmission line to the second local ground (step 302), connecting each phase of the first three-phase transmission line to a second terminal node (step 304), obtaining a second zero-sequence current that may pass through the second terminal node (step 306), measuring a second zero-sequence voltage of an uncoupled segment of the first three-phase transmission line (step 308), and calculating the second zero-sequence impedance based on the second zero-sequence current and the second zero-sequence voltage (step 310).

Referring to FIGS. 1C and 3, in an exemplary embodiment, step 302 may include connecting sending end 118 of first three-phase transmission line 108 to second local ground 122 by closing an exemplary earthing switch that may be connected between sending end 118 and second local ground 122. An exemplary earthing switch may be configured to ground sending end 118 when the earthing switch is closed. An exemplary earthing switch may be connected to each phase (for example, first phase 108R, second phase 108S, and third phase 108T) of first three-phase transmission line 108 at sending end 118. Therefore, all phases of first three-phase transmission line 108 may be grounded when an exemplary earthing switch is closed.

In an exemplary embodiment, step 304 may include connecting each phase of first three-phase transmission line 108 to a second terminal node 140 at an uncoupled test point 138 of first three-phase transmission line 108. In an exemplary embodiment, uncoupled test point 138 may be located at uncoupled segment 136.

In an exemplary embodiment, step 306 may include obtaining the second zero-sequence current that may pass through second terminal node 140. An exemplary second zero-sequence current may be generated on first three-phase transmission line 108 due to the induced voltage from a coupled segment with second three-phase transmission line 110. In an exemplary embodiment, obtaining the second zero-sequence current may include measuring each respective electric current that may pass through each respective phase (for example, first phase 108R, second phase 108S, and third phase 108T) of first three-phase transmission line 108. In an exemplary embodiment, a respective current sensor may be utilized for measuring each respective current. For example, a current sensor 144 may be utilized to measure an electric current that may flow through first phase 108R. In an exemplary embodiment, electric currents that pass through all phases of first three-phase transmission line 108 may be simultaneously measured. Samples of the measured electric current may be transmitted to processing unit 112 at a given sampling rate (for example, about 10 kHz) to calculate a phasor of each electric current. In an exemplary embodiment, a full-cycle DFT algorithm may be applied to the samples of each measured electric current to calculate the corresponding phasor.

In an exemplary embodiment, the second zero-sequence current may be obtained by calculating a phasor of the second zero-sequence current according to an operation defined by the following:

$$\overline{I_0} = \overline{I_R} + \overline{I_S} + \overline{I_T} \quad \text{Equation (4)}$$

where $\overline{I_0}$ is the phasor of the second zero-sequence current, $\overline{I_R}$ is a phasor of a first electric current that may pass through first phase 108R of first three-phase transmission line 108, $\overline{I_S}$ is a phasor of a second electric current that may pass through second phase 108S of first three-phase transmission line 108, and $\overline{I_T}$ is a phasor of a third electric current that may pass through third phase 108T of first three-phase transmission line 108.

In an exemplary embodiment, step 308 may include measuring the second zero-sequence voltage of uncoupled segment 136. An exemplary second zero-sequence voltage may be generated on first three-phase transmission line 108 due to the induced voltage from a coupled segment with second three-phase transmission line 110. An exemplary voltage sensor may be utilized for measuring the second zero-sequence voltage between second terminal node 140 and a third local ground 142 simultaneously with measuring the electric currents of first three-phase transmission line 108 in step 306. Simultaneous measurement of the second zero-sequence voltage and the electric currents of three-phase transmission line 108 (step 306) may lead to consistency of the measured signals, thereby removing a need for phase compensation.

For further detail with respect to step 310, in an exemplary embodiment, the second zero-sequence impedance may be calculated after obtaining the second zero-sequence current and the second zero-sequence voltage according to an operation defined by the following:

$$\overline{Z0_{uncoupled}} = \frac{3\overline{V_0}}{\overline{I_0}} \quad \text{Equation (5)}$$

where $\overline{Z0_{uncoupled}}$ is a phasor of the second zero-sequence impedance and $\overline{V_0}$ is a phasor of the second zero-sequence voltage.

Figure 4:
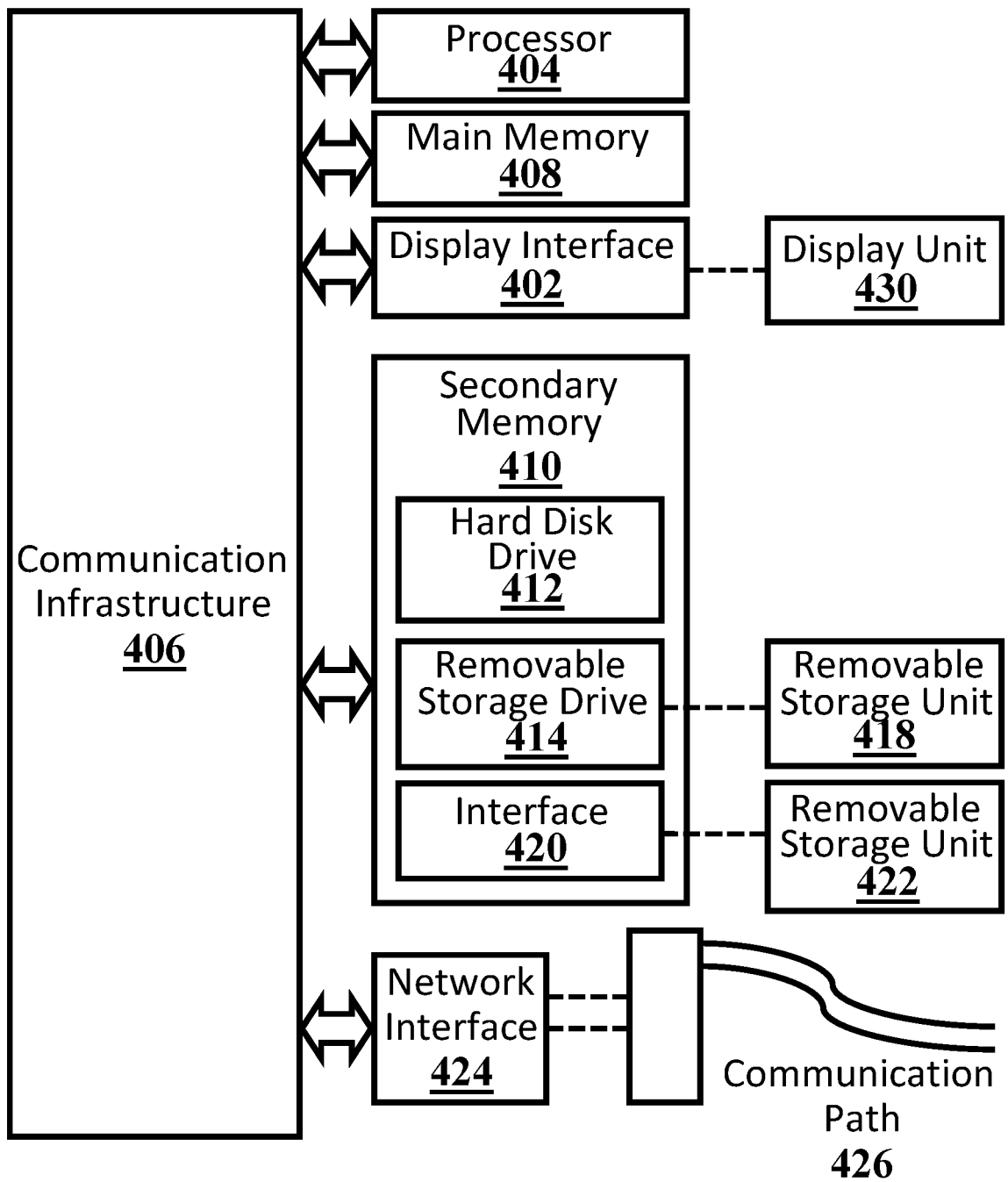
FIG. 4 shows a high-level functional block diagram of a computer system, consistent with one or more exemplary embodiments of the present disclosure.

FIG. 4 shows an example computer system 400 in which an embodiment of the present invention, or portions thereof, may be implemented as computer-readable code, consistent with exemplary embodiments of the present disclosure. For example, different steps of method 100 may be implemented in computer system 400 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A-3, for example, processing unit 112 in FIGS. 1A, 1B, and 1C.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 300. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 404 may be a special purpose (e.g., a graphical processing unit) or a general-purpose processor device. As will be appreciated by persons skilled in the relevant art, processor device 404 may also be a single processor in a multi-core/multiprocessor system, such system operating alone, or in a cluster of computing devices operating in a cluster or server farm. Processor device 404 may be connected to a communication infrastructure 406, for example, a bus, message queue, network, or multi-core message-passing scheme.

In an exemplary embodiment, computer system 400 may include a display interface 402, for example a video connector, to transfer data to a display unit 430, for example, a monitor. Computer system 400 may also include a main memory 408, for example, random access memory (RAM), and may also include a secondary memory 410. Secondary memory 410 may include, for example, a hard disk drive 412, and a removable storage drive 414. Removable storage drive 414 may include a floppy disk drive, a magnetic tape drive, an optical disk drive, a flash memory, or the like. Removable storage drive 414 may read from and/or write to a removable storage unit 418 in a well-known manner. Removable storage unit 418 may include a floppy disk, a magnetic tape, an optical disk, etc., which may be read by and written to by removable storage drive 414. As will be appreciated by persons skilled in the relevant art, removable storage unit 418 may include a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 may be in the form of signals, which may be electronic, electromagnetic, optical, or other signals capable of being received by communications interface 424. These signals may be provided to communications interface 424 via a communications path 426. Communications path 426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, and a hard disk installed in hard disk drive 412. Computer program medium and computer usable medium may also refer to memories, such as main memory 408 and secondary memory 410, which may be memory semiconductors (e.g. DRAMs, etc.).

Computer programs (also called computer control logic) are stored in main memory 408 and/or secondary memory 410. Computer programs may also be received via communications interface 424. Such computer programs, when executed, enable computer system 400 to implement different embodiments of the present disclosure as discussed herein. In particular, the computer programs, when executed, enable processor device 404 to implement the processes of the present disclosure, such as the operations in method 200 illustrated by flowcharts of FIGS. 2A-3 discussed above. Accordingly, such computer programs represent controllers of computer system 400. Where an exemplary embodiment of method 200 is implemented using software, the software may be stored in a computer program product and loaded into computer system 400 using removable storage drive 414, interface 420, and hard disk drive 412, or communications interface 424.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Example

In this example, performance of an exemplary method similar to exemplary method 200 for is demonstrated. An exemplary method similar to exemplary method 200 is applied to a computer simulation of an exemplary power system setup similar to exemplary power system setup 100A, second power system setup 100B, or third power system setup 100C. A total electric current passing through a simulated AC transmission line (similar to second three-phase transmission line 110) which is partially coupled with another line (similar to first three-phase transmission line 108) in a power system is set to about 500 A. Table 1 shows actual and measured values of a first zero-sequence impedance (similar to Z0 in Equation 3) and a second zero-sequence impedance (similar to $\overline{Z0_{uncoupled}}$ in Equation 5) of the simulated partially coupled line. As shown in Table 1, measured values have less than about 0.7% error with respect to actual impedance values.

TABLE 1

Actual and measured values of a first zero-sequence impedance and a second zero-sequence impedance of simulated partially coupled lines

| Impedance | Actual Value | Estimated Value | Resistance Error (%) | Reactance Error(%) |
|---|---|---|---|---|
| $Z0_{coupled}$ | 12.22 + j64.74 | 12.22 + j64.77 | 0 | 0.05 |
| $Z0_{uncoupled}$ | 7.8 + j33.1 | 7.75 + j33 | −0.64 | −0.3 |

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for zero-sequence impedance measurement of coupled AC transmission lines, the method comprising:
measuring a first zero-sequence impedance of a first three-phase transmission line configured to transmit electric power from a first substation of a power system to a second substation of the power system, the first three-phase transmission line partially coupled with a second three-phase transmission line, the second three-phase transmission line configured to transmit electric power to a third substation of the power system, measuring the first zero-sequence impedance comprising:
disconnecting the first three-phase transmission line from the power system;
connecting a receiving end of the first three-phase transmission line to a first local ground;
connecting each phase of the first three-phase transmission line at a sending end of the first three-phase transmission line to a first terminal node;
connecting the first terminal node to a second local ground by closing a single-phase circuit breaker connected between the first terminal node and the second local ground;
measuring, utilizing a current sensor, a short-circuit current passing through the first terminal node to the second local ground;
obtaining a first zero-sequence current of the first three-phase transmission line due to an induced voltage on the first three-phase transmission line from the second three-phase transmission line by compensating a phase of the short-circuit current according to a phase of a first reference signal;
disconnecting the first terminal node from the second local ground by opening the single-phase circuit breaker;
connecting a primary side of a potential transformer (PT) between the first terminal node and the second local ground;
measuring a secondary voltage of the PT at a secondary side of the PT;
obtaining an open-circuit voltage at the first terminal node by measuring a primary voltage of the PT at the primary side responsive to the secondary voltage satisfying a condition according to $aV_m < V_{th}$ where:
a is a turn ratio of the PT where $a>1$,
$V_m$ is an amplitude of the secondary voltage, and
$V_{th}$ is voltage measurement threshold;
obtaining the open-circuit voltage according to an operation defined by $\overline{V_{oc}} = a\overline{V_m}$ responsive to the secondary voltage satisfying a condition according to $aV_m \geq V_{th}$, where $\overline{V_{oc}}$ is a phasor of the open-circuit voltage and $\overline{V_m}$ is a phasor of the secondary voltage;

obtaining a first zero-sequence voltage of the first three-phase transmission line due to the induced voltage by compensating a phase of the open-circuit voltage according to a phase of a second reference signal; and calculating, utilizing one or more processors, the first zero-sequence impedance based on the first zero-sequence current and the first zero-sequence voltage;

connecting the sending end of the first three-phase transmission line to the second local ground;

connecting each phase of the first three-phase transmission line at an uncoupled test point of the first three-phase transmission line to a second terminal node, the uncoupled test point located at the uncoupled segment;

obtaining a second zero-sequence current passing through the second terminal node by measuring, utilizing a respective current sensor, each respective electric current passing through each respective phase of the first three-phase transmission line due to the induced voltage;

measuring, utilizing a voltage sensor, a second zero-sequence voltage of the first three-phase transmission line due to the induced voltage at the second terminal node; and calculating, utilizing the one or more processors, a second zero-sequence impedance of an uncoupled segment of the first three-phase transmission line based on the second zero-sequence current and the second zero-sequence voltage.

2. A method for zero-sequence impedance measurement of coupled AC transmission lines, the method comprising:

measuring a first zero-sequence impedance of a first three-phase transmission line configured to transmit electric power from a first substation of a power system to a second substation of the power system, the first three-phase transmission line partially coupled with a second three-phase transmission line, the second three-phase transmission line configured to transmit electric power to a third substation of the power system, measuring the first zero-sequence impedance comprising:

disconnecting the first three-phase transmission line from the power system;

connecting a receiving end of the first three-phase transmission line to a first local ground;

connecting each phase of the first three-phase transmission line at a sending end of the first three-phase transmission line to a first terminal node;

obtaining a first zero-sequence current of the first three-phase transmission line due to an induced voltage on the first three-phase transmission line from the second three-phase transmission line;

obtaining a first zero-sequence voltage of the first three-phase transmission line due to the induced voltage; and calculating, utilizing one or more processors, the first zero-sequence impedance based on the first zero-sequence current and the first zero-sequence voltage.

3. The method of claim 2, wherein obtaining the first zero-sequence current comprises:

connecting the first terminal node to a second local ground by closing a single-phase circuit breaker connected between the first terminal node and the second local ground;

measuring, utilizing a current sensor, a short-circuit current passing through the first terminal node to the second local ground; and obtaining the first zero-sequence current from the short-circuit current by compensating a phase of the short-circuit current according to a phase of a first reference signal.

4. The method of claim 3, wherein obtaining the first zero-sequence voltage comprises:

disconnecting the first terminal node from the second local ground by opening the single-phase circuit breaker;

measuring, utilizing a voltage sensor, an open-circuit voltage at the first terminal node; and obtaining the first zero-sequence voltage from the open-circuit voltage by compensating a phase of the open-circuit voltage according to a phase of a second reference signal.

5. The method of claim 4, wherein opening the single-phase circuit breaker comprises opening the single-phase circuit breaker less than 1 second after measuring the short-circuit current.

6. The method of claim 4, wherein measuring the open-circuit voltage comprises:

connecting a primary side of a potential transformer (PT) between the first terminal node and the second local ground;

measuring a secondary voltage of the PT at a secondary side of the PT;

obtaining the open-circuit voltage by measuring a primary voltage of the PT at the primary side responsive to the secondary voltage satisfying a condition according to $aV_m < V_{th}$, where:

a is a turn ratio of the PT where $a>1$, $V_m$ is an amplitude of the secondary voltage, and $V_{th}$ is voltage measurement threshold; and obtaining the open-circuit voltage according to an operation defined by $\overline{V_{oc}} = a\overline{V_m}$ responsive to the secondary voltage satisfying a condition according to $aV_m \geq V_{th}$, where $\overline{V_{oc}}$ is a phasor of the open-circuit voltage and $\overline{V_m}$ is a phasor of the secondary voltage.

7. The method of claim 3, wherein compensating the phase of the short-circuit current comprises:

measuring the first reference signal at a busbar of the second substation simultaneously with measuring the short-circuit current; and calculating, utilizing the one or more processors, the first zero-sequence current according to an operation defined by the following:

$$\overline{I_{comp}} = I_{sc} < (\theta_{sc} - \theta_{ref1})$$

where:

$\overline{I_{comp}}$ is a phasor of the first zero-sequence current, $I_{sc}$ is an amplitude of the short-circuit current, $\theta_{sc}$ is a phase of the short-circuit current, and $\theta_{ref1}$ is a phase of the first reference signal.

8. The method of claim 7, wherein compensating the phase of the open-circuit voltage comprises:

measuring the second reference signal at the busbar simultaneously with measuring the open-circuit voltage; and calculating, utilizing the one or more processors, the first zero-sequence voltage according to an operation defined by the following:

$$\overline{V_{comp}} = V_{oc} < (\theta_{oc} - \theta_{ref2})$$

where:

$\overline{V_{comp}}$ is a phasor of the first zero-sequence voltage,
$V_{oc}$ is an amplitude of the open-circuit voltage,
$\theta_{oc}$ is a phase of the open-circuit voltage, and
$\theta_{ref2}$ is a phase of the second reference signal.

9. The method of claim 8, wherein calculating the first zero-sequence impedance comprises calculating the first zero-sequence impedance according to an operation defined by the following:

$$\overline{Z0_{coupled}} = \frac{3\overline{V_{comp}}}{\overline{I_{comp}}}$$

where $\overline{Z0_{coupled}}$ is a phasor of the first zero-sequence impedance.

10. The method of claim 2, further comprising measuring a second zero-sequence impedance of an uncoupled segment of the first three-phase transmission line by:
connecting the sending end of the first three-phase transmission line to the second local ground;
connecting each phase of the first three-phase transmission line at an uncoupled test point of the first three-phase transmission line to a second terminal node, the uncoupled test point located at the uncoupled segment;
obtaining a second zero-sequence current passing through the second terminal node by measuring, utilizing a respective current sensor, each respective electric current passing through each respective phase of the first three-phase transmission line due to the induced voltage;
measuring, utilizing a voltage sensor, a second zero-sequence voltage of the first three-phase transmission line due to the induced voltage at the second terminal node; and
calculating, utilizing the one or more processors, the second zero-sequence impedance based on the second zero-sequence current and the second zero-sequence voltage.

11. The method of claim 10, wherein obtaining the second zero-sequence current comprises calculating, utilizing the one or more processors, a phasor of the second zero-sequence current according to an operation defined by the following:

$\overline{I_0} = \overline{I_R} + \overline{I_S} + \overline{I_T}$ where:
$\overline{I_0}$ is the phasor of the second zero-sequence current,
$\overline{I_R}$ is a phasor of a first electric current passing through a first phase of the first three-phase transmission line,
$\overline{I_S}$ is a phasor of a second electric current passing through a second phase of the first three-phase transmission line, and
$\overline{I_T}$ is a phasor of a third electric current passing through a third phase of the first three-phase transmission line.

12. The method of claim 11, wherein calculating the second zero-sequence impedance comprises calculating the second zero-sequence impedance according to an operation defined by the following:

$$\overline{Z0_{uncoupled}} = \frac{3\overline{V_0}}{\overline{I_0}}$$

where $\overline{Z0_{uncoupled}}$ is a phasor of the second zero-sequence impedance and $\overline{V_0}$ is a phasor of the second zero-sequence voltage.

* * * * *